US007787098B2

(12) United States Patent
Baek

(10) Patent No.: US 7,787,098 B2
(45) Date of Patent: Aug. 31, 2010

(54) MANUFACTURING METHOD OF A LIQUID CRYSTAL DISPLAY DEVICE COMPRISING A FIRST PHOTOSENSITIVE LAYER OF A POSITIVE TYPE AND A SECOND PHOTOSENSITIVE LAYER OF A NEGATIVE TYPE

(75) Inventor: Myoung-Kee Baek, Seoul (KR)

(73) Assignee: LG Display Co., Ltd., Seoul (KR)

( * ) Notice: Subject to any disclaimer, the term of this patent is extended or adjusted under 35 U.S.C. 154(b) by 624 days.

(21) Appl. No.: 11/168,328

(22) Filed: Jun. 29, 2005

(65) Prior Publication Data
US 2006/0028610 A1  Feb. 9, 2006

(30) Foreign Application Priority Data
Aug. 6, 2004  (KR) ............ 10-2004-0061990

(51) Int. Cl.
*G02F 1/1339* (2006.01)
*G02F 1/13* (2006.01)
(52) U.S. Cl. ............... 349/187; 349/155; 349/156
(58) Field of Classification Search ......... 349/155–157, 349/187
See application file for complete search history.

(56) References Cited
U.S. PATENT DOCUMENTS

| 6,501,527 B1* | 12/2002 | Hirose et al. | 349/155 |
| 2003/0214623 A1* | 11/2003 | Ebisu et al. | 349/156 |
| 2004/0183989 A1* | 9/2004 | Kim et al. | 349/155 |

FOREIGN PATENT DOCUMENTS

| KR | 10-2004-0018674 A | 3/2004 | |
| KR | 20040018674 | * 4/2004 | 349/156 |
| KR | 10-2004-0040636 A | 5/2004 | |

OTHER PUBLICATIONS

Kim et al., Liquid Crytsal Display and Method of Fabricating the Same, Aug. 26, 2002, KIPO (English Machine Translation).*

* cited by examiner

*Primary Examiner*—Andrew Schechter
*Assistant Examiner*—Charles Chang
(74) *Attorney, Agent, or Firm*—Morgan Lewis & Bockius LLP

(57) ABSTRACT

A manufacturing method of a liquid crystal display device includes forming a gate line and a data line on a substrate with the gate and data lines crossing each other to define a pixel region; forming a thin film transistor at a crossing portion of the gate and data lines; forming a passivation layer on the substrate and the thin film transistor; forming a transparent conductive layer on the passivation layer; forming a first photosensitive layer on a portion of the transparent conductive layer over the thin film transistor; forming a second photosensitive layer on the transparent conductive layer and the first photosensitive layer; patterning the second photosensitive layer and the first photosensitive layer to form a photosensitive pattern and a columnar spacer exposing a portion of the transparent conductive layer; forming a pixel electrode by patterning the transparent conductive layer exposed by the photosensitive pattern and the columnar spacer; and removing the photosensitive pattern.

9 Claims, 16 Drawing Sheets

MANUFACTURING METHOD OF A LIQUID CRYSTAL DISPLAY DEVICE COMPRISING A FIRST PHOTOSENSITIVE LAYER OF A POSITIVE TYPE AND A SECOND PHOTOSENSITIVE LAYER OF A NEGATIVE TYPE

This application claims the benefit of Korean Patent Application No. 2004-0061990 filed in Korea on Aug. 6, 2004, which is hereby incorporated by reference.

BACKGROUND OF THE INVENTION

1. Field of the Invention

The present invention relates to a liquid crystal display device, and more particularly, to a liquid crystal display device including a columnar spacer and a manufacturing method thereof.

2. Discussion of the Related Art

A liquid crystal display (LCD) device is driven based on the optical anisotropy and polarization characteristics of a liquid crystal material. In general, the LCD device includes two substrates spaced apart and facing each other with a liquid crystal material layer interposed between the two substrates. Each of the substrates includes respective electrodes facing each other such that a voltage applied to each electrode induces an electric field between the electrodes perpendicular to the substrates. An alignment of liquid crystal molecules of the liquid crystal material layer changes by varying an intensity or direction of the applied electric field. Accordingly, the LCD device displays an image by varying light transmittance through the liquid crystal material layer in accordance with the arrangement of the liquid crystal molecules.

FIG. 1 is an expanded perspective view illustrating a related art LCD device. As shown in FIG. 1, the LCD device 11 includes an upper substrate 5, referred to as a color filter substrate, and a lower substrate 22, referred to as an array substrate, having a liquid crystal layer 14 interposed therebetween. On the upper substrate 5, a black matrix 6 and a color filter layer 8 are formed in a shape of an array matrix including a plurality of red (R), green (G), and blue (B) color filters surrounded by corresponding portions of the black matrix 6. Additionally, a common electrode 18 is formed on the upper substrate 5 to cover the color filter layer 8 and the black matrix 6.

On the lower substrate 22, a plurality of gate lines 13 perpendicularly cross a plurality of data lines 15 to define a matrix. A plurality of thin film transistors (TFTs) T are positioned such that each TFT T is located at a respective intersection of one of the gate lines 13 and one of the data lines 15. Furthermore, a plurality of pixel electrodes 17 are formed on respective pixel regions P defined between the gate lines 13 and the data lines 15 of the lower substrate 22. The pixel electrode 17 includes a transparent conductive material having high transmittance, such as indium-tin-oxide (ITO) or indium-zinc-oxide (IZO).

As further shown in FIG. 1, a storage capacitor $C_{ST}$ is disposed in each pixel and connected in parallel to the pixel electrode 17 of the pixel. The storage capacitor $C_{ST}$ comprises a portion of the gate line 13 as a first capacitor electrode and a metal pattern 30 as a second capacitor electrode. Since the metal pattern 30 is connected to the pixel electrode 17 through a contact hole, the storage capacitor $C_{ST}$ is electrically contacted to the pixel electrode 17. The metal pattern 30 may be made of the same material as the data line 15. When fabricating the LCD device 11 of FIG. 1, the upper substrate 5 is aligned with and attached to the lower substrate 22.

Although not shown in FIG. 1, spacers are formed between the first and second substrates to maintain a uniform cell gap. The spacers may be spherical spacers, which are sprayed on one of the upper and lower substrates 5 and 22, or columnar spacers, which are directly patterned on one of the upper and lower substrates 5 and 22.

FIG. 2 is a cross-sectional view of the related art liquid crystal display (LCD) device and corresponds to a cross-section along the line II-II of FIG. 1. The related art LCD device includes a columnar spacer.

As shown in FIG. 2, the related art LCD device includes an upper substrate 5, a lower substrate 22, and a liquid crystal layer 14. The upper and lower substrates 5 and 22 are spaced apart from each other with the liquid crystal layer 14 interposed therebetween.

A pixel region P including a switching region S and a storage region ST are defined on the lower substrate 22. A thin film transistor T is formed in the switching region S and comprises a gate electrode 32, an active layer 34, a source electrode 36 and a drain electrode 38. A storage capacitor $C_{ST}$ is formed in the storage region ST and comprises a portion of a gate line 13 as a first capacitor electrode and a metal pattern 30 as a second electrode. The metal pattern 30 has an island shape and overlaps the portion of the gate line 13. The metal pattern 30 contacts the pixel electrode 17. The storage capacitor $C_{ST}$ may have various structures and shapes. A passivation layer 40 is formed on the thin film transistor T and the storage capacitor $C_{ST}$. A transparent pixel electrode 17 is formed on the passivation layer 40 in the pixel region P and is connected to the drain electrode 38.

In FIG. 2, the upper substrate 5 is spaced apart from the lower substrate 22. On an inner surface of the upper substrate 5, a black matrix 6 is disposed in the position corresponding to the thin film transistor T, the gate line 13 and a data line 15 of FIG. 1. The black matrix 6 is formed on the entire surface of the upper substrate 5 and has openings corresponding to the pixel electrode 17 of the lower substrate 11, as shown in FIG. 1. The black matrix 6 prevents light leakage in the LCD device except for the portion for the pixel electrode 17. The black matrix 6 protects the thin film transistor T from the light such that the black matrix 6 prevents generating of photo current in the thin film transistor T. A color filter layer including color filters 8a, 8b and 8c is formed on the inner surface of the upper substrate 5 to cover the black matrix 6. Each of color filters 8a, 8b and 8c has one of the red, green, and blue colors and corresponds to one pixel region P where the pixel electrode 17 is located. A common electrode 18 formed of a transparent conductive material is disposed on the color filter layer 8a, 8b and 8c over the upper substrate 5.

Here, a columnar spacer 20 is formed between the upper and lower substrates 5 and 22 and corresponds to the thin film transistor T. The columnar spacer 20 may be formed on one of the upper and lower substrates 5 and 22.

A method of forming a columnar spacer according to the related art will be explained hereinafter with reference to attached drawings. FIGS. 3A to 3D illustrate processes of forming a columnar spacer according to the related art.

As illustrated in FIG. 3A, photosensitive resin is coated on a substrate 50, thereby forming a photosensitive layer 52. The photosensitive resin may be photoresist, which is used in a photolithographic process. The photosensitive resin may be a positive type, in which a portion exposed to light is developed and removed, or a negative type, in which a portion not exposed to light is developed and removed.

Next, as illustrated in FIG. 3B or FIG. 3C, a mask M is disposed over the photosensitive layer 52. The mask M includes a transmitting portion B1 and a blocking portion B2.

Here, the photosensitive layer 52 of FIG. 3B is a positive type, and the photosensitive layer 52 of FIG. 3C is a negative type. In FIG. 3B, the blocking portion B2 of the mask M corresponds to a region for forming a columnar spacer. In FIG. 3C, the transmitting portion B1 of the mask M corresponds to the region for forming the columnar spacer.

Subsequently, the photosensitive layer 52 is exposed to light through the mask M and is developed. Therefore, as illustrated in FIG. 3D, a columnar spacer 54 is formed in a desired region. As stated above, the columnar spacer 54 may be formed on the array substrate or the color filter substrate.

However, to form the columnar spacer, an additional photolithographic process is required after manufacturing the array substrate or the color filter substrate. Moreover, since more than 95% of the photosensitive layer is removed, materials are wasted, thereby increasing costs.

SUMMARY OF THE INVENTION

Accordingly, the present invention is directed to a liquid crystal display (LCD) device and a manufacturing method thereof that substantially obviates one or more of the problems due to limitations and disadvantages of the related art.

An object of the present invention is to provide a liquid crystal display device and a manufacturing method thereof that reduces manufacturing costs and time and decreases problems during processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of a liquid crystal display device, comprises forming a gate line and a data line on a substrate, the gate and data lines crossing each other to define a pixel region; forming a thin film transistor at a crossing portion of the gate and data lines; forming a passivation layer on the substrate and the thin film transistor; forming a transparent conductive layer on the passivation layer; forming a first photosensitive layer on a portion of the transparent conductive layer over the thin film transistor; forming a second photosensitive layer on the transparent conductive layer and the first photosensitive layer; patterning the second photosensitive layer and the first photosensitive layer to form a photosensitive pattern and a columnar spacer exposing a portion of the transparent conductive layer; forming a pixel electrode by patterning the transparent conductive layer exposed by the photosensitive pattern and the columnar spacer; and removing the photosensitive pattern.

In another aspect, a manufacturing method of a liquid crystal display device comprises forming a transparent conductive layer on a substrate; forming a first photosensitive layer on a portion of the transparent conductive layer using an inkjet method; forming a second photosensitive layer on the transparent conductive layer and the first photosensitive layer; patterning the second photosensitive layer and the first photosensitive layer to form a photosensitive pattern and a columnar spacer exposing a portion of the transparent conductive layer; removing the portion of the transparent conductive layer exposed by the photosensitive pattern and the columnar spacer; and removing the photosensitive pattern.

In another aspect, a liquid crystal display device comprises a gate line and a data line on a substrate, the gate and data lines crossing each other to define a pixel region; a thin film transistor at a crossing portion of the gate and data lines; a passivation layer on substantially an entire surface of the substrate including the thin film transistor; a pixel electrode disposed on the passivation layer in the pixel region and connected to the thin film transistor; a transparent conductive pattern on the passivation layer over the thin film transistor; and a columnar spacer on the transparent conductive pattern, the columnar spacer having an area equal to an area of the transparent conductive pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiment of the present invention, an example of which is illustrated in the accompanying drawings.

Figure 1:
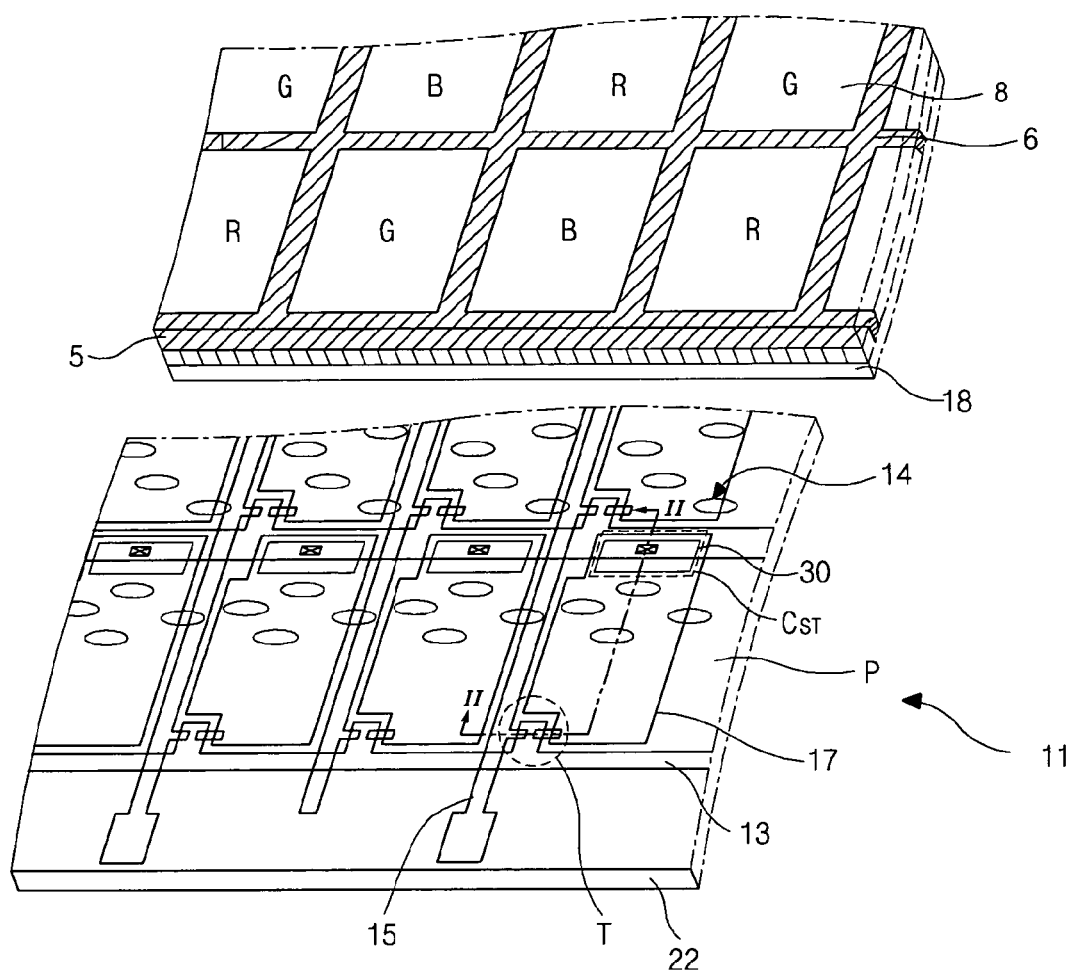
FIG. 1 is an expanded perspective view illustrating a related art liquid crystal display (LCD) device.
Figure 2:
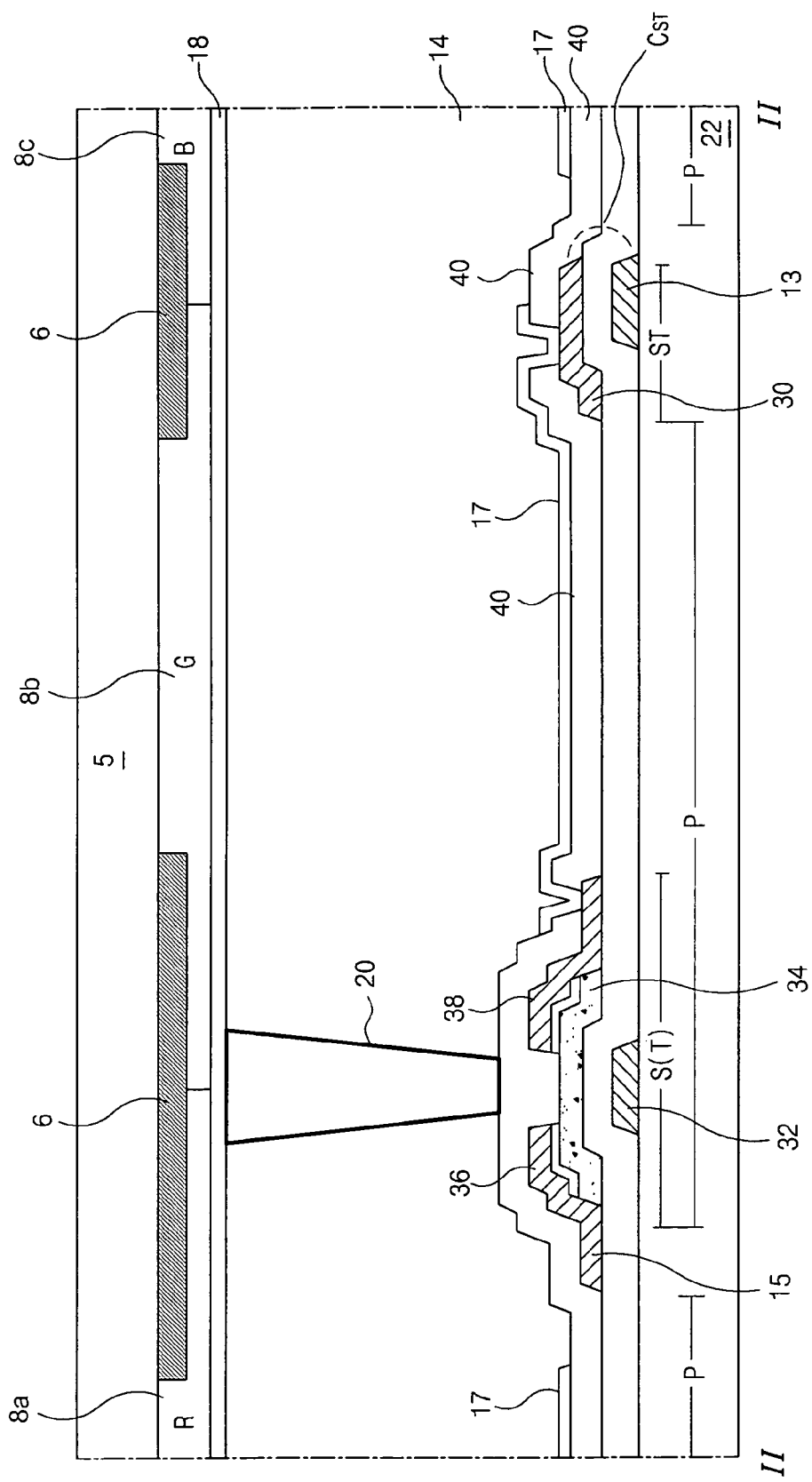
FIG. 2 is a cross-sectional view of the related art LCD device along the line II-II of FIG. 1.
Figure 3A:
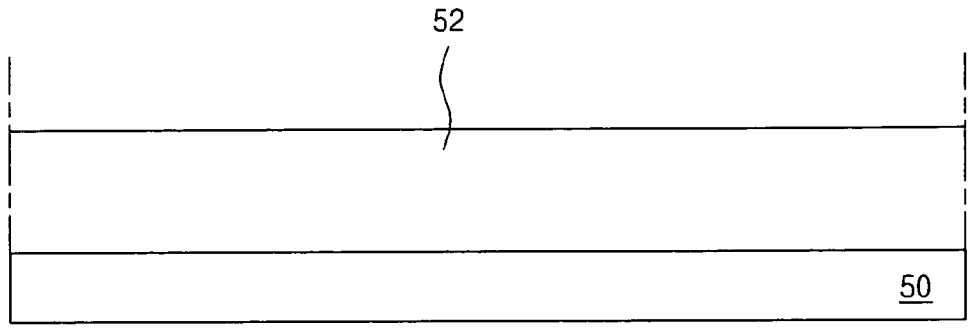
FIGS. 3A to 3D are cross-sectional views illustrating processes of forming a columnar spacer according to the related art.
Figure 3B:
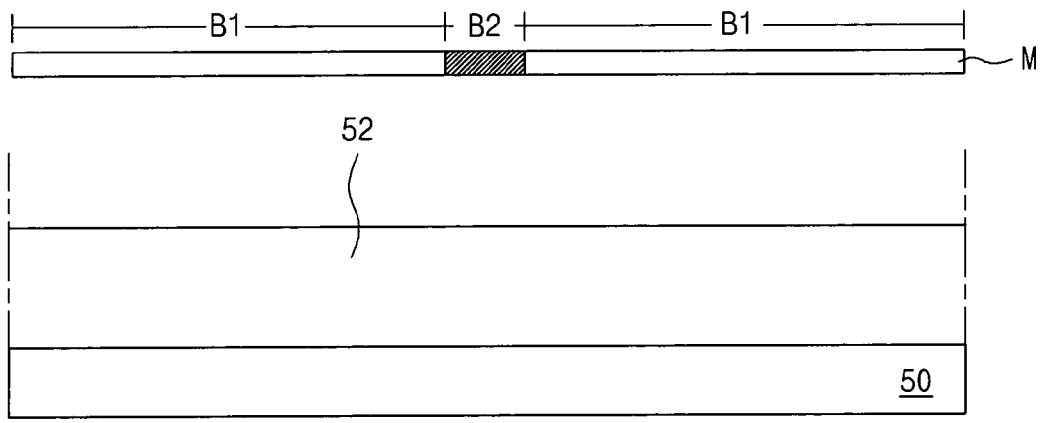
Figure 3C:
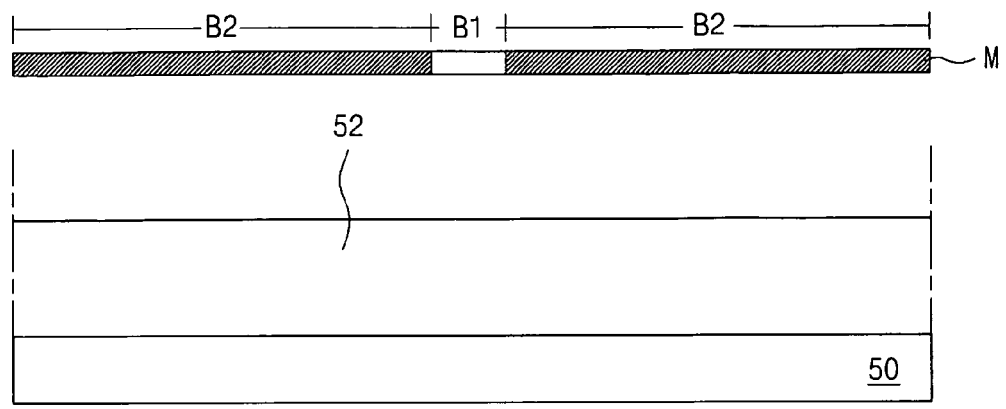
Figure 3D:
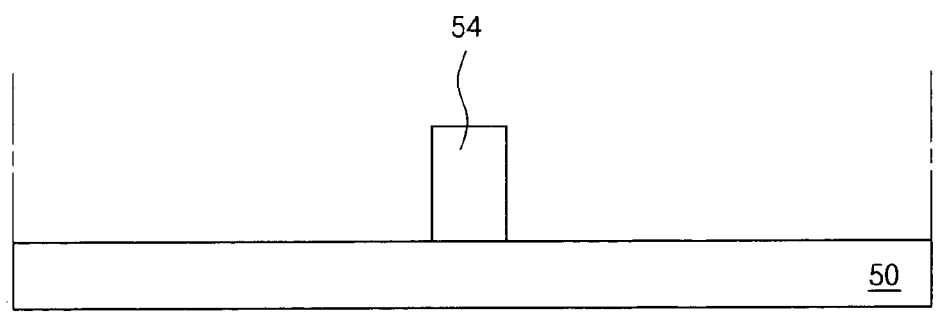
Figure 4:
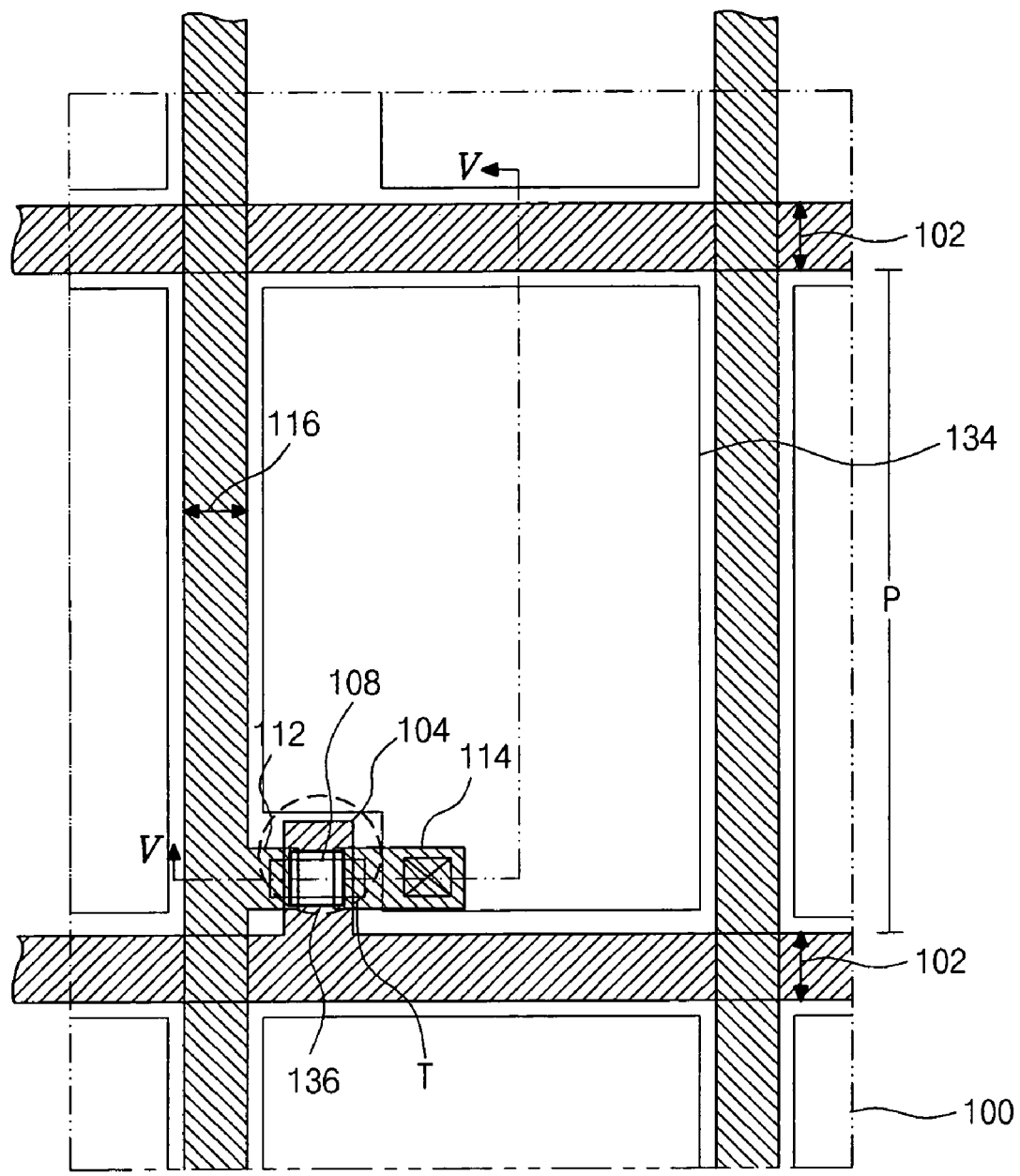
FIG. 4 a plan view of an array substrate for an LCD device according to an exemplary embodiment of the present invention.

FIG. 4 is a plan view of an array substrate for an LCD device according to an exemplary embodiment of the present invention. In FIG. 4, a gate line 102 and a data line 116 are formed on a substrate 100. The gate line 102 and the data line 116 cross each other to define a pixel region P. A thin film transistor T is formed as a switching element at the crossing of the gate and data lines 102 and 116. The thin film transistor T includes a gate electrode 104 that is connected to the gate line 102 and receives scanning signals, a source electrode 112 that is connected to the data line 116 and receives data signals, and a drain electrode 114 that is spaced apart from the source electrode 112. The thin film transistor T further includes an active layer 108 between the gate electrode 104 and the source and drain electrodes 112 and 114. A pixel electrode 134 is formed in the pixel region P and is connected to the drain electrode 114.

A columnar spacer 136 is formed over the thin film transistor T. The columnar spacer 136 may be formed over the gate line 102 or the data line 116. Here, the columnar spacer 136 is formed through the same process as the pixel electrode 134.

Although not shown in FIG. 4, an ohmic contact layer is formed between the active layer 108 and the source and drain electrodes 112 and 114. Additionally, a metal pattern may be formed over the gate line 102 and may be connected to the pixel electrode 134. The metal pattern and the gate line 102 constitute a storage capacitor.

In accordance with the present invention, the columnar spacer 136 and the pixel electrode 134 are formed through a photolithographic process using an inkjet method and a lift-off method.

A manufacturing method of an array substrate for an LCD device according the present invention will now be explained hereinafter with reference to attached drawings. FIGS. 5A to 5J views are cross-sectional views along line V-V of FIG. 4 illustrating a manufacturing method of an array substrate including a columnar spacer according to the exemplary embodiment of FIG. 4

Figure 5A:
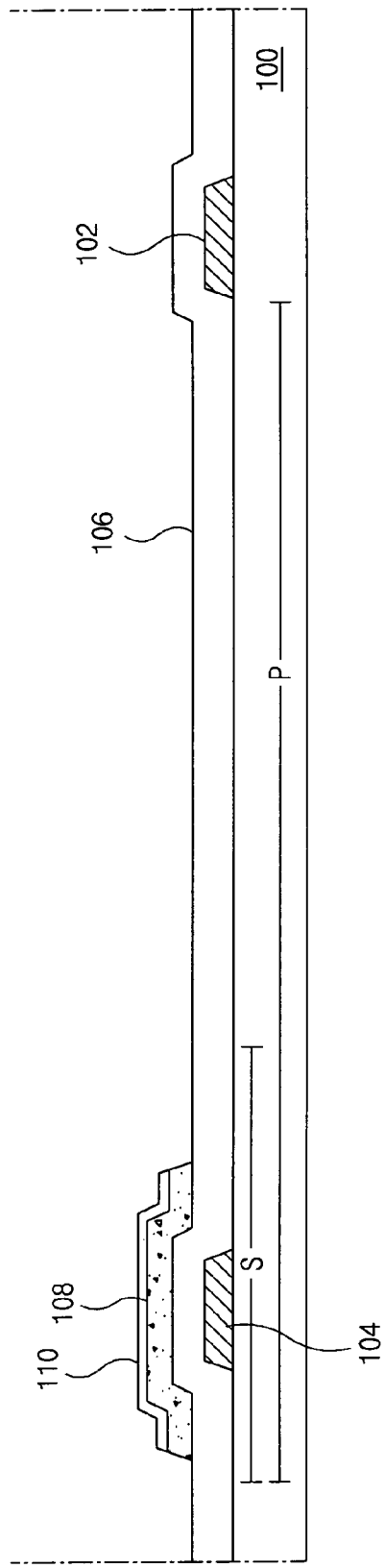
FIGS. 5A to 5J are cross-sectional views illustrating a manufacturing method of an array substrate including a columnar spacer according to the embodiment of FIG. 4.

As illustrated in FIG. 5A, a pixel region P including a switching region S is defined on a substrate 100. A gate line 102 and a gate electrode 104 are formed on the substrate 100 by sequentially depositing and then patterning one or more metallic material. The metallic material includes aluminum (Al), an aluminum alloy (AlNd), copper (Cu), tungsten (W), chromium (Cr) and molybdenum (Mo). The gate electrode 104 corresponds to the switching region S, and the gate electrode 104 is connected to the gate line 102. The gate line 102 is formed along one side of the pixel region P.

A gate insulating layer 106 is formed on the entire surface of the substrate 100 including the gate electrode 104 and the gate line 102 thereon by depositing an inorganic insulating material, such as silicon nitride ($SiN_x$) or silicon oxide ($SiO_2$). Next, an active layer 108 and an ohmic contact layer 110 are formed on the gate insulating layer 106 over the gate electrode 104 by sequentially depositing and then patterning intrinsic amorphous silicon and impurity-doped amorphous silicon.

Figure 5B:
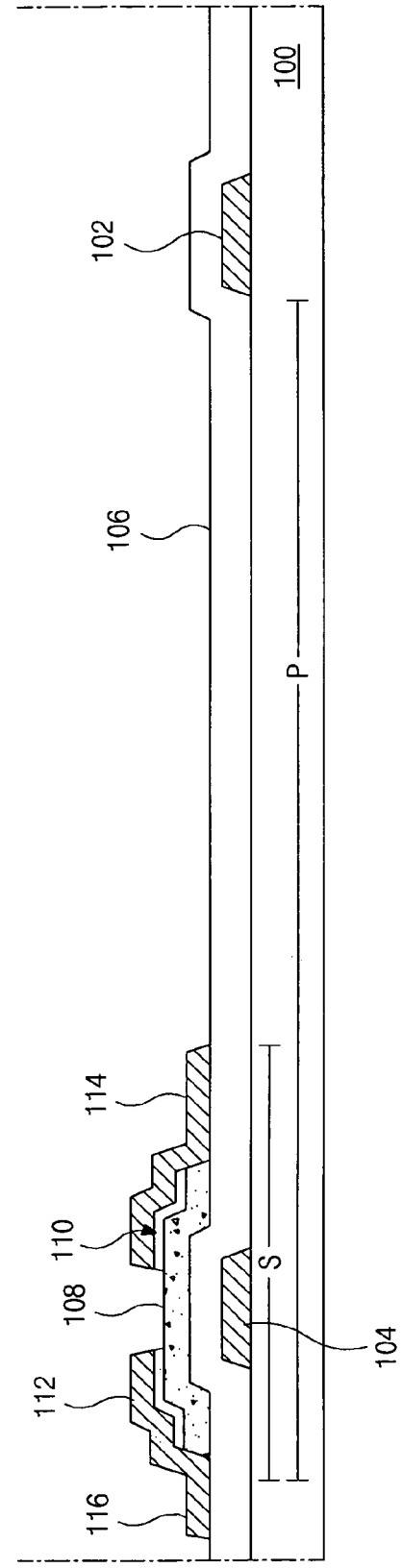

As illustrated in FIG. 5B, source and drain electrodes 112 and 114 are formed on the ohmic contact layer 110 by sequentially depositing and then patterning one or more metallic material. The source and drain electrodes 112 and 114 are spaced apart from each other on the ohmic contact layer 110. The gate electrode 104, the active layer 108, the source electrode 112 and the drain electrode 114 form a thin film transistor. A data line 116 connected to the source electrode 112 is formed simultaneously with the source and drain electrodes 108 and 110. Subsequently, a portion of the ohmic contact layer 110 exposed between the source and drain electrodes 108 and 110 is removed, thereby completing the ohmic contact layer 110.

Figure 5C:
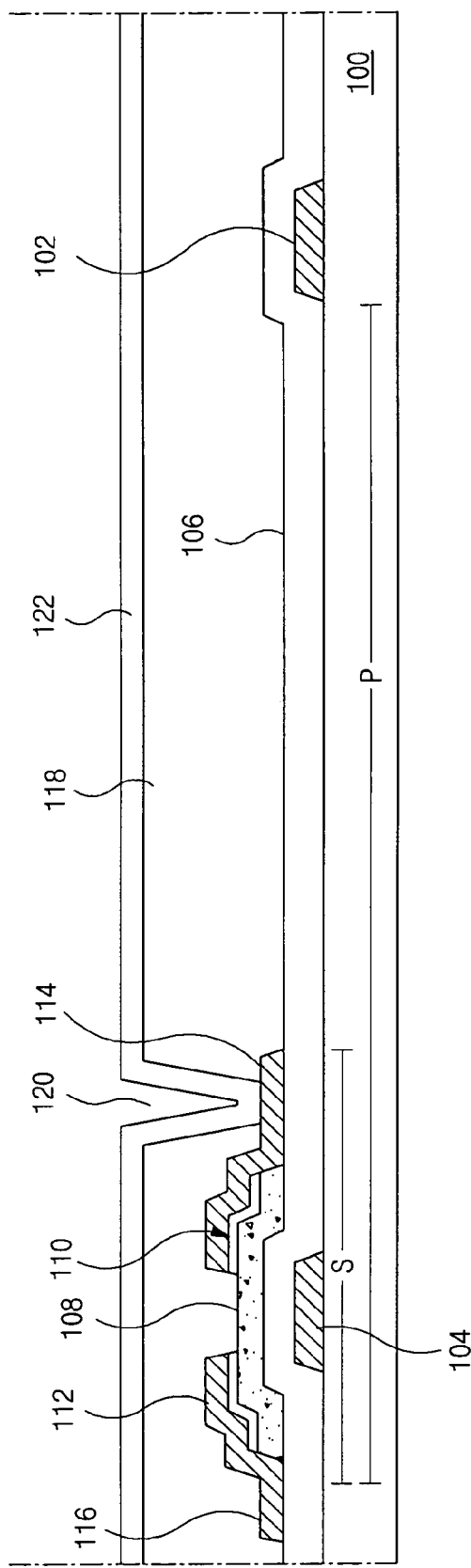

As illustrated in FIG. 5C, a passivation layer 118 is formed on substantially an entire surface of the substrate 100 including the data line 116 and the source and drain electrodes 112 and 114 thereon by depositing an inorganic insulating material such as silicon nitride ($SiN_x$) or silicon oxide ($SiO_2$) or by coating an organic insulating material, such as benzocyclobutene (BCB) or acrylic resin. The passivation layer 118 is patterned, thereby forming a drain contact hole 120 to expose a portion of the drain electrode 114.

Next, a transparent conductive layer 122 is formed on substantially an entire surface of the substrate 100 including the passivation layer 118 thereon by depositing a transparent conductive material, such as indium tin oxide (ITO) or indium zinc oxide (IZO).

Figure 5D:
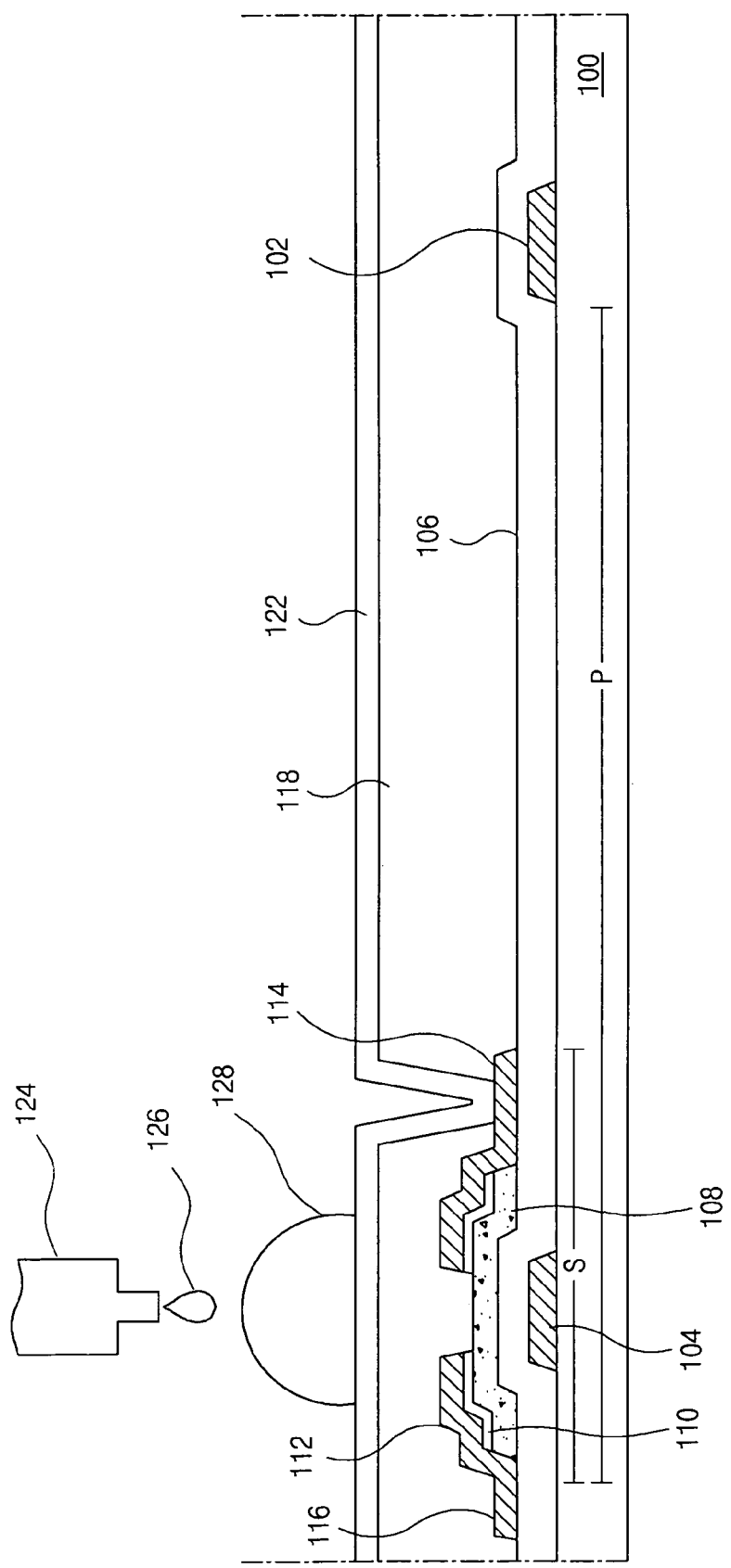

As illustrated in FIG. 5D, a first photosensitive layer 128 having a determined thickness is selectively formed on the transparent conductive layer 122 over the thin film transistor using an inkjet method. In the inkjet method, photosensitive resin 126 is jetted through a nozzle 124. The photosensitive resin 126 may be a positive type or a negative type. The substrate 100 including the first photosensitive layer 128 is heat-treated through a soft back process, which is performed under relatively low temperatures, and thus, the first photosensitive layer 128 is hardened.

Figure 5E:
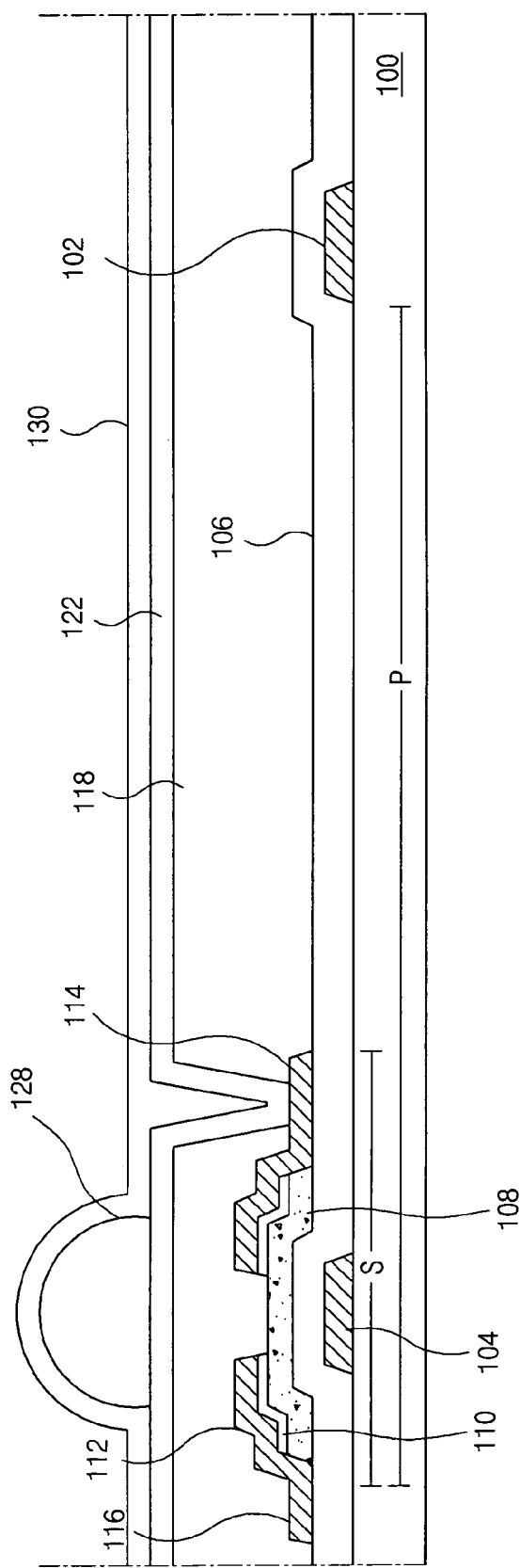

As illustrated in FIG. 5E, a second photosensitive layer 130 is formed on substantially an entire surface of the substrate 100 including the first photosensitive layer 128 thereon by coating photosensitive resin and covers the first photosensitive layer 128. The second photosensitive layer 130 may be a positive type or a negative type. If the first photosensitive layer 128 is a positive type, the second photosensitive layer 130 may be a negative type. Alternatively, if the first photosensitive layer 128 is a negative type, the second photosensitive layer 130 may be a positive type. In the illustrated embodiment, the first photosensitive layer 128 is a positive type, and the second photosensitive layer 130 is a negative type, for example.

Figure 5F:
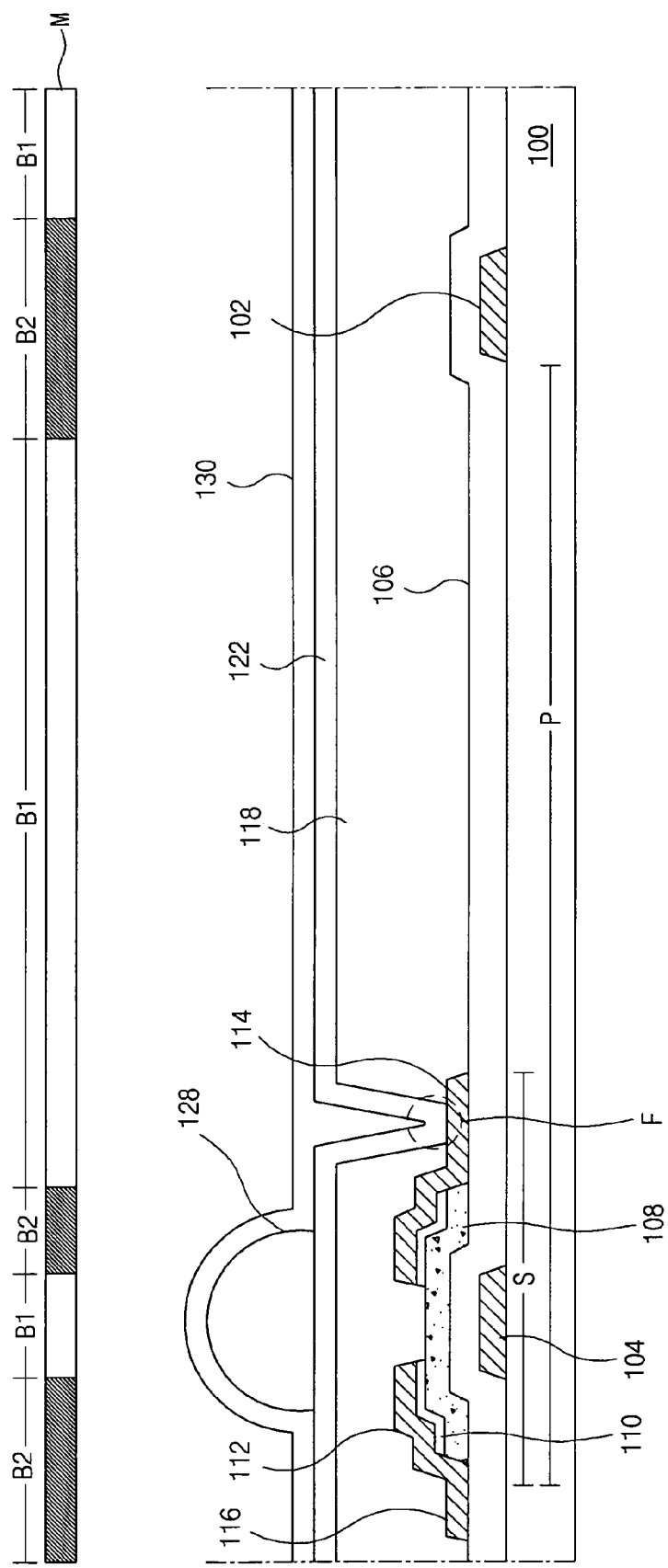

As illustrated in FIG. 5F, a mask M including a transmitting portion B1 and a blocking portion B2 is disposed over the second photosensitive layer 130. The transmitting portion B1 of the mask M corresponds to a central portion of the first photosensitive layer 128 and the pixel region P. The blocking portion B2 of the mask M corresponds to a peripheral portion of the first photosensitive layer 128, the gate line 102 and the data line 116. Here, a contact region F between the drain electrode 114 and the transparent conductive layer 122 corresponds to the transmitting portion B1 of the mask M. Meanwhile, if the first photosensitive layer 128 is a negative type and the second photosensitive layer 130 is a positive type, positions of the transmitting portion B1 and the blocking portion B2 are opposite to those in FIG. 5F.

Figure 5G:
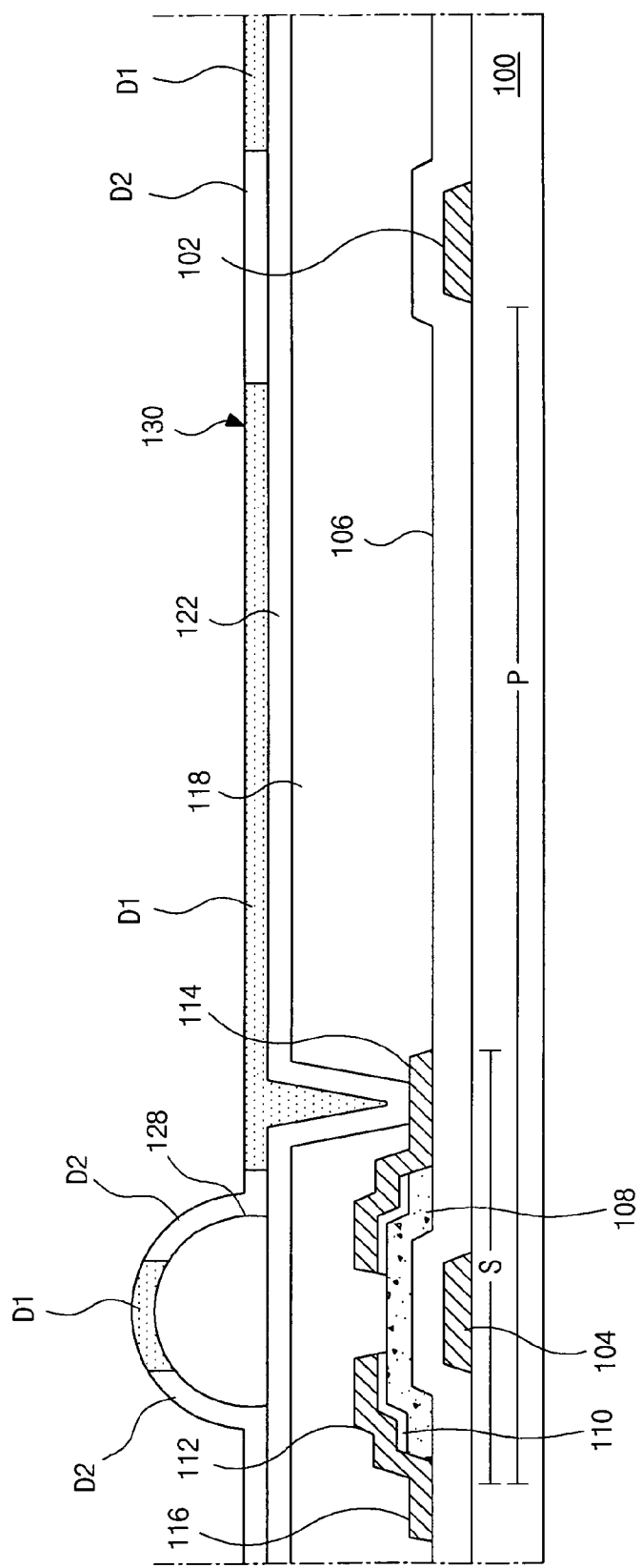

Next, the second photosensitive layer 130 is exposed to light such as ultraviolet rays through the mask M. Then, as illustrated in FIG. 5G, a first portion D1 of the second photosensitive layer 130 corresponding to the transmitting portion B1 of the mask M has a changed property, while a second portion D2 of the second photosensitive layer 130 corresponding to the blocking portion B2 of the mask M keeps its property intact.

Figure 5H:
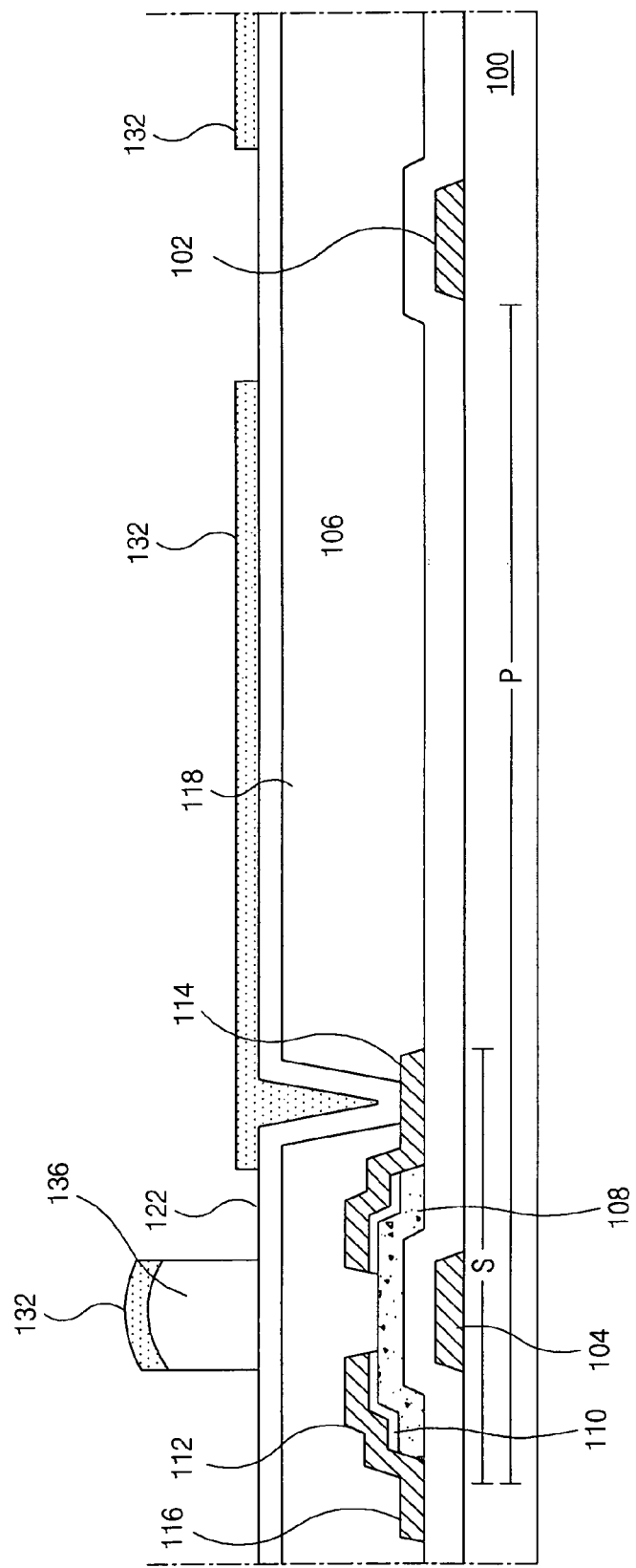

A developing process is performed by spraying developer from above the substrate 100. The developing process may be carried out by dipping the substrate 100 into a tank containing developer. Thus, as illustrated in FIG. 5H, the second photosensitive layer 130 of FIG. 5G not exposed to light is removed, so that a photosensitive pattern 132 is formed and the transparent conductive layer 122 is exposed. At this time, the first photosensitive layer 128 of FIG. 5G is also selectively removed, and a columnar spacer 136 is formed under the photosensitive pattern 132 in the switching region S. The first photosensitive layer 128 of FIG. 5G is selectively removed by a lift-off method. The thickness of the columnar spacer 136 depends on types of a liquid crystal display device. The columnar spacer 136 may have a thickness of about 1 μm to about 7 μm.

Figure 5I:
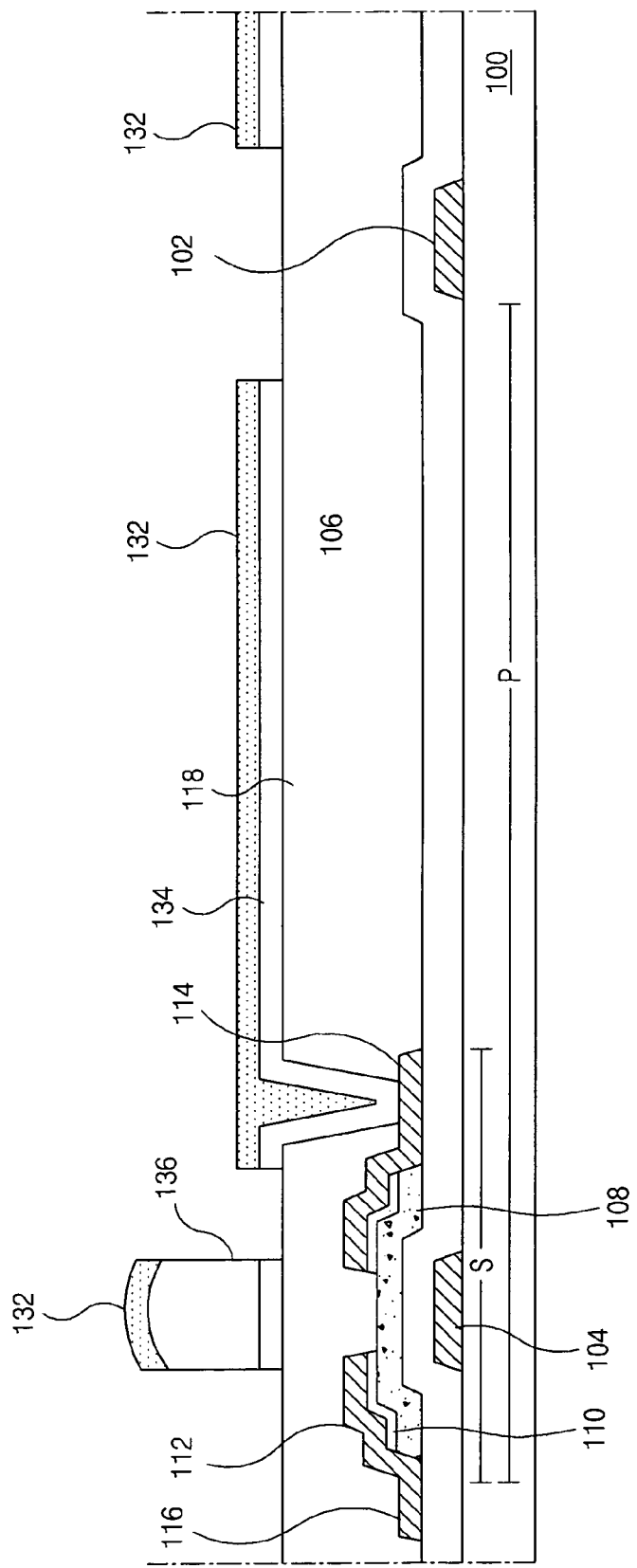

As illustrated in FIG. 5I, a pixel electrode 134 is formed in each pixel region P by patterning the transparent conductive layer 122 of FIG. 5H using the photosensitive pattern 132 as an etching mask. The pixel electrode 134 is connected to the drain electrode 114. Here, a portion of the transparent conductive layer 122 under the columnar spacer 136 is not removed and remains.

Figure 5J:
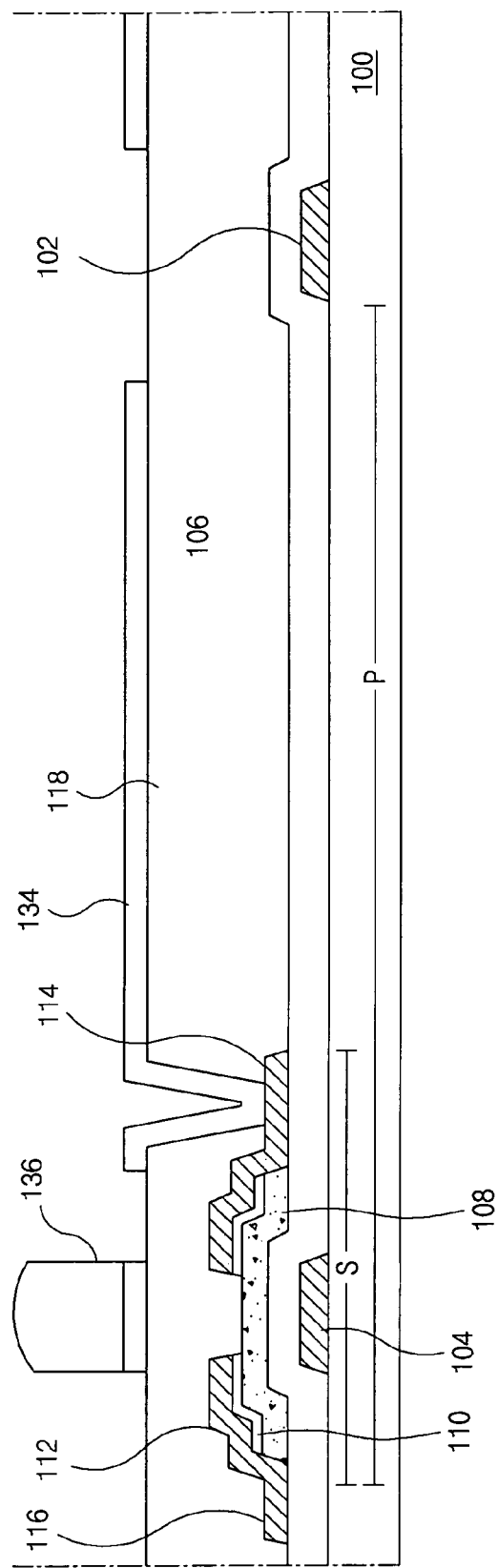

As illustrated in FIG. 5J, the photosensitive pattern 132 of FIG. 5I is removed. Therefore, the array substrate of the present invention is fabricated through the above-mentioned processes.

Figure 6A:
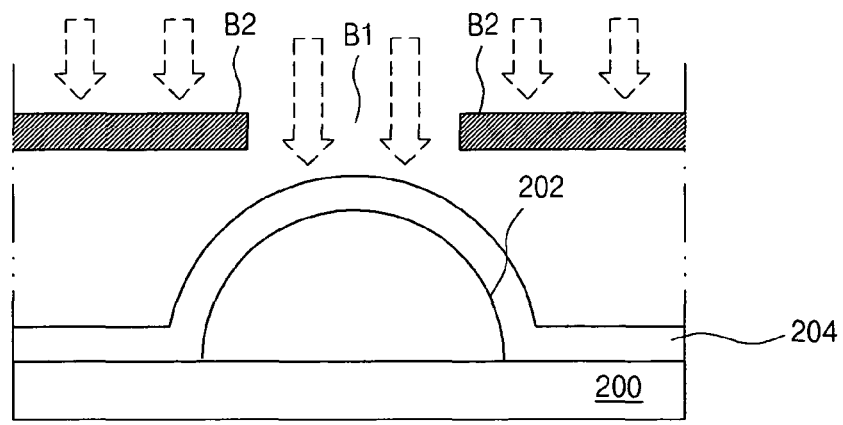
FIGS. 6A to 6C are cross-sectional views illustrating an exemplary lift-off method according to the present invention.
Figure 6B:
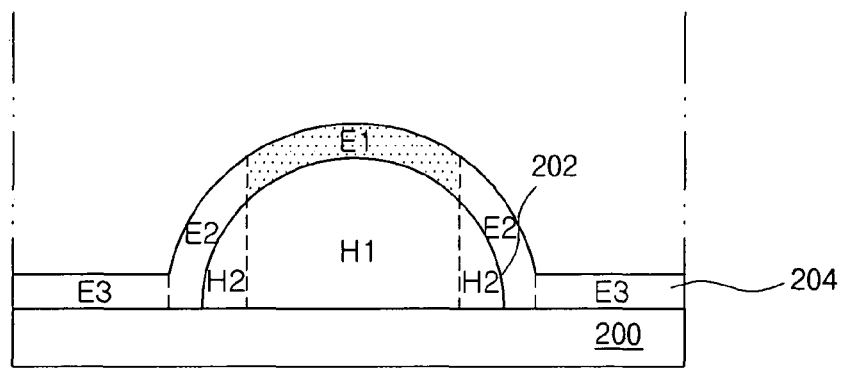
Figure 6C:
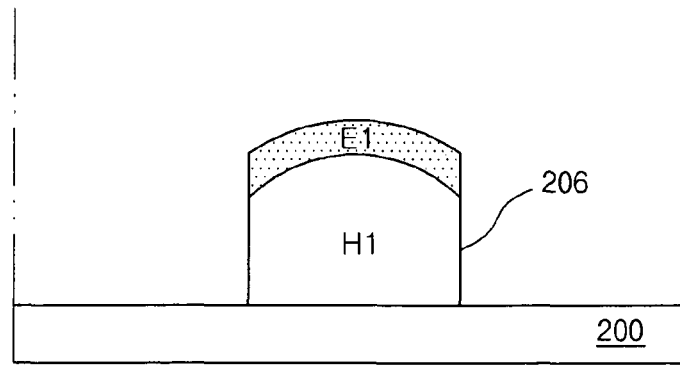

Meanwhile, the lift-off method in the present invention will be explained in more detail with reference to attached drawings. FIGS. 6A to 6C are cross-sectional views illustrating an exemplary lift-off method according to the present invention.

In FIG. 6A, a first photosensitive layer 202 having a predetermined thickness is selectively formed on a substrate 200 using an inkjet method. The first photosensitive layer 202 may be a positive type or a negative type. A second photosensitive layer 204 is formed on substantially an entire surface of the substrate 200 including the first photosensitive layer 202 thereon by coating photosensitive resin. The second photosensitive layer 204 may be a positive type or a negative type. If the first photosensitive layer 202 is a positive type, the second photosensitive layer 204 may be a negative type. Alternatively, if the first photosensitive layer 202 is a negative type, the second photosensitive layer 204 may be a positive type. Here, the first photosensitive layer 202 is a positive type, and the second photosensitive layer 204 is a negative type, for example.

Next, a mask M including a transmitting portion B1 and a blocking portion B2 is disposed over the second photosensitive layer 204. Since the second photosensitive layer 204 is a negative type, the transmitting portion B1 corresponds to a portion of the second photosensitive layer 204 to remain, and the blocking portion B2 corresponds to a portion of the second photosensitive layer 204 to be removed. Then, the second photosensitive layer 204 is exposed to light through the mask M.

As illustrated in FIG. 6B, a first portion E1 of the second photosensitive layer 204 corresponding to the transmitting portion B1 of the mask M has a changed property due to the light. On the other hand, a second portion E2 and a third portion E3 of the second photosensitive layer 204 corresponding to the blocking portion B2 of the mask M keep its property intact. Here, the first portion E1 is disposed directly on a central portion H1 of the first photosensitive layer 202, the second portion E2 is disposed directly on a peripheral portion H2 of the first photosensitive layer 202, and the third portion E3 is disposed directly on the substrate 200.

As illustrated in FIG. 6C, the second and third portion E2 and E3 of the second photosensitive layer 204 of FIG. 6B are removed through a developing process, and thus the first part E1 of the second photosensitive layer 204 remains. At this time, the peripheral portion H2 of the first photosensitive layer 202 of FIG. 6B is also removed by a lift-off method. That is, the peripheral portion H2 of the first photosensitive layer 202 of FIG. 6B is torn and thus removed when the second part E2 of the second photosensitive layer 204 is removed, while the central portion H1 of the first photosensitive layer 202 remains due to the first portion E1 of the second photosensitive layer 204. The central portion H1 of the first photosensitive layer 202 functions as a columnar spacer 206.

Figure 7:
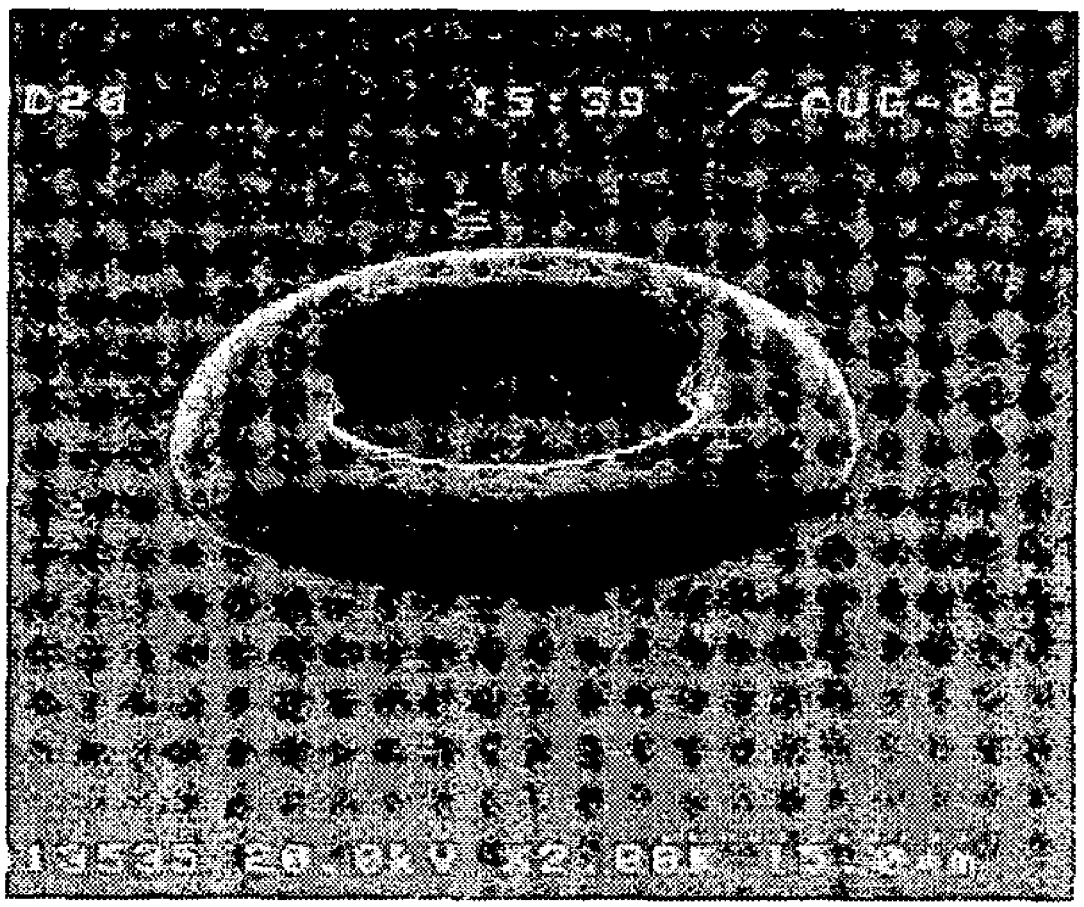
FIG. 7 is a scanning electron microscope (SEM) picture showing a structure formed by a lift-off method according to the present invention.

FIG. 7 is a scanning electron microscope (SEM) picture showing a structure formed by a lift-off method according to the present invention.

In FIG. 7, a central portion of a photosensitive layer is removed contrary to the embodiment in which a peripheral portion of the photosensitive layer is removed. As illustrated in FIG. 8, the central portion of the photosensitive layer is completely removed by the lift-off method.

In the illustrated embodiment, the columnar spacer is formed on the array substrate. However, the columnar spacer may be formed on a color filter substrate if a transparent electrode is formed on the color filter substrate and then is patterned.

In accordance with the present invention, since the pixel electrode and the columnar spacer are formed through a photolithographic process using an inkjet method and a lift-off method, the manufacturing processes are simplified. Accordingly, manufacturing costs and time are reduced, and problems are decreased, thereby increasing productivity.

It will be apparent to those skilled in the art that various modifications and variations can be made in a liquid crystal display device having a columnar spacer and a manufacturing method thereof of the present invention without departing from the spirit or scope of the invention. Thus, it is intended that the present invention cover the modifications and variations of this invention provided they come within the scope of the appended claims and their equivalents.

What is claimed is:

1. A manufacturing method of a liquid crystal display device, comprising:
    forming a gate line and a data line on a substrate, the gate and data lines crossing each other to define a pixel region;
    forming a thin film transistor at a crossing portion of the gate and data lines;
    forming a passivation layer on the substrate and the thin film transistor;
    forming a transparent conductive layer on the passivation layer;
    forming a first photosensitive layer on a portion of the transparent conductive layer over the thin film transistor;
    forming a second photosensitive layer contacting and directly on the transparent conductive layer and the first photosensitive layer;
    patterning the second photosensitive layer and the first photosensitive layer to form a photosensitive pattern and a columnar spacer exposing a portion of the transparent conductive layer, wherein the photosensitive pattern includes first and second patterns, the first pattern is disposed directly over the columnar spacer, and the second pattern is disposed in the pixel region;
    forming a pixel electrode by patterning the transparent conductive layer exposed by the photosensitive pattern and the columnar spacer, wherein the pixel electrode is disposed directly under the second pattern; and
    removing the photosensitive pattern,
    wherein the first photosensitive layer is a positive type, and the second photosensitive layer is a negative type, wherein patterning the second photosensitive layer and the first photosensitive layer includes:
        disposing a mask having a transmitting portion and a blocking portion over the second photosensitive layer, the transmitting portion corresponding to both the pixel electrode and a center of the columnar spacer;
        exposing the second photosensitive layer to light through the mask; and
        simultaneously removing a peripheral portion of the second photosensitive layer and a peripheral portion of the first photosensitive layer corresponding to the blocking portion.

2. The method according to claim 1, wherein the first photosensitive layer is formed by an inkjet method.

3. The method according to claim 1, wherein patterning the second photosensitive layer and the first photosensitive layer includes removing a central portion of the first photosensitive layer using a lift-off method when the second photosensitive layer exposed to light is removed.

4. The method according to claim 1, wherein the thin film transistor includes a gate electrode connected to the gate line, an active layer disposed over the gate electrode, a source electrode connected to the data line, and a drain electrode spaced apart from the source electrode and connected to the pixel electrode.

5. The method according to claim 4, wherein the passivation layer includes a contact hole exposing the drain electrode.

6. The method according to claim 5, wherein the pixel electrode contacts the drain electrode through the contact hole.

7. The method according to claim 1, wherein the predetermined thickness of the first photosensitive layer is within a range of about 1 μm to about 7 μm.

8. A manufacturing method of a liquid crystal display device, comprising:
    forming a transparent conductive layer on a substrate;
    forming a first photosensitive layer on a portion of the transparent conductive layer using an inkjet method;
    forming a second photosensitive layer contacting and directly on the transparent conductive layer and the first photosensitive layer;
    patterning the second photosensitive layer and the first photosensitive layer to form a photosensitive pattern and a columnar spacer exposing a portion of the transparent conductive layer, wherein the photosensitive pattern includes first and second patterns, the first pattern is disposed directly over the columnar spacer;
    removing the portion of the transparent conductive layer exposed by the photosensitive pattern and the columnar spacer to form a pixel electrode, wherein the pixel electrode is disposed directly under the second pattern; and
    removing the photosensitive pattern,
    wherein the first photosensitive layer is a positive type, and the second photosensitive layer is a negative type, wherein patterning the second photosensitive layer and the first photosensitive layer includes:
        disposing a mask having a transmitting portion and a blocking portion over the second photosensitive layer, the transmitting portion corresponding to both the pixel electrode and a center of the columnar spacer;
        exposing the second photosensitive layer to light through the mask; and
        simultaneously removing a peripheral portion of the second photosensitive layer and a peripheral portion of the first photosensitive layer corresponding to the blocking portion.

9. The method according to claim 8, wherein the columnar spacer has a thickness corresponding to a cell gap of the liquid crystal display device.

* * * * *